(12) United States Patent
Simonneaux et al.

(10) Patent No.: US 9,346,538 B2
(45) Date of Patent: May 24, 2016

(54) LANDING GEAR FAIRING

(71) Applicant: Messier-Dowty Limited, Gloucester, Gloucestershire (GB)

(72) Inventors: Yann Simonneaux, Cheltenham (GB); Simon D. Harris, Gloucester (GB)

(73) Assignee: Messier-Dowty Limited (GB)

( * ) Notice: Subject to any disclaimer, the term of this patent is extended or adjusted under 35 U.S.C. 154(b) by 0 days.

(21) Appl. No.: 14/377,018

(22) PCT Filed: Jan. 23, 2013

(86) PCT No.: PCT/GB2013/050137
§ 371 (c)(1),
(2) Date: Aug. 6, 2014

(87) PCT Pub. No.: WO2013/117902
PCT Pub. Date: Aug. 15, 2013

(65) Prior Publication Data
US 2015/0083857 A1 Mar. 26, 2015

(30) Foreign Application Priority Data
Feb. 6, 2012 (GB) .................................. 1202016.0

(51) Int. Cl.
*B64C 25/00* (2006.01)
*B64C 25/16* (2006.01)
*B64C 25/32* (2006.01)

(52) U.S. Cl.
CPC .................. *B64C 25/16* (2013.01); *B64C 25/32* (2013.01); *B64C 2025/003* (2013.01)

(58) Field of Classification Search
CPC ........ B64C 25/16; B64C 25/00; B64C 25/10; B64C 25/40; B64C 25/12; B64C 2025/003
See application file for complete search history.

(56) References Cited

U.S. PATENT DOCUMENTS 2,176,461 A 10/1939 Larsen
2,390,127 A 12/1945 Schneckloth
(Continued)

FOREIGN PATENT DOCUMENTS

GB 2415169 12/2005
GB 2475919 6/2011
(Continued)

OTHER PUBLICATIONS

Combined Search Report and Examination Report for Application No. GB1202016.0 dated Jun. 6, 2012.
(Continued)

*Primary Examiner* — Tien Dinh
*Assistant Examiner* — Aaron Rodziwicz
(74) *Attorney, Agent, or Firm* — RatnerPrestia

(57) ABSTRACT

An aircraft landing gear including wheels and a fairing arranged to be moveable between a first and a second configuration, wherein in the first configuration the fairing is arranged to shield an element of the landing gear from incident airflow and wherein in the second configuration the fairing is arranged to deflect debris or spray propelled from one or more of the wheels.

9 Claims, 7 Drawing Sheets

(56) References Cited

U.S. PATENT DOCUMENTS

| | | | |
|---|---|---|---|
| 2,653,846 A | 9/1953 | Wiley | |
| 3,670,996 A | 6/1972 | Jenny | |
| 4,155,523 A * | 5/1979 | Morford et al. | 244/103 R |
| 4,258,929 A | 3/1981 | Brandon et al. | |
| 4,352,502 A | 10/1982 | Leonard et al. | |
| 4,408,736 A | 10/1983 | Kirschbaum et al. | |
| 4,681,285 A | 7/1987 | Bowdy et al. | |
| 5,058,827 A | 10/1991 | Dansereau et al. | |
| 6,619,587 B1 | 9/2003 | Chow et al. | |
| 7,669,798 B2 | 3/2010 | Guering et al. | |
| 7,946,531 B2 | 5/2011 | Jackson | |
| 8,371,524 B2 | 2/2013 | Chow et al. | |
| 9,027,878 B2 | 5/2015 | Simonneaux | |
| 2006/0032981 A1 * | 2/2006 | Fort | 244/129.4 |
| 2006/0102775 A1 | 5/2006 | Chow et al. | |
| 2007/0095977 A1 | 5/2007 | Gabrys | |
| 2008/0006742 A1 * | 1/2008 | Guering et al. | 244/121 |
| 2009/0321559 A1 | 12/2009 | Chow et al. | |
| 2011/0186680 A1 | 8/2011 | Ekmedzic | |
| 2011/0215196 A1 * | 9/2011 | Foster et al. | 244/100 R |
| 2011/0233327 A1 * | 9/2011 | Mellor et al. | 244/102 A |
| 2012/0292442 A1 * | 11/2012 | Simonneaux | 244/100 R |

FOREIGN PATENT DOCUMENTS

| | | |
|---|---|---|
| SU | 236252 | 11/2004 |
| WO | WO2010/052447 | 5/2010 |
| WO | WO2011/070340 | 6/2011 |

OTHER PUBLICATIONS

International Search Report and Written Opinion for PCT International Application No. PTC/GB2013/050137 dated Mar. 14, 2013.
Office Action for Chinese Application No. 201380008192.4 dated Jul. 3, 2015.
Amendment filed in European Application No. 13703863.4 dated Feb. 25, 2015.

* cited by examiner

LANDING GEAR FAIRING

FIELD OF THE INVENTION

The invention relates to aircraft landing gear and in particular to fairings on aircraft landing gear.

BACKGROUND TO THE INVENTION

Fairings are used on aircraft landing gears to reduce noise and turbulent airflows generated by the landing gear during landing and take-off. Such fairings are often positioned in front of noise inducing components to shield them from incident airflow and also to protect the landing gear from damage caused by impact from foreign bodies. Attempts have been made to provide more efficient noise reduction using articulated fairings which can fully cover high noise inducing components such as brakes while the aircraft is airborne and yet allow full airflow over the same components during touch down (see for example GB 2475919).

Fairings are also used on landing gears to contain foreign object projections into the airframe, engines or other critical aircraft elements while an aircraft is on the ground. A non-limiting example is an aircraft configuration with propellers at the rear of the airframe. Such aircraft are subject to damage from foreign objects such as tyre shred or runway debris, propelled from the landing gear wheels. Recent advancements in propeller technology have led to their increasing application in civil and military aviation. When wing mounted, such engines are susceptible to damage due to projections from nose landing gear. Moreover, it is believed that with the evolution of turboprop technology, future aircraft may incorporate rear mounted turboprops, which will require main landing gear to be positioned further to the rear of the airframe. Accordingly, projection containment from the landing gear is now even more paramount to safety and reliability of modern aircraft than ever before.

SUMMARY OF THE INVENTION

According to a first aspect of the invention there is provided an aircraft landing gear including wheels and a fairing arranged to be moveable, whilst the landing gear is extended, between a first configuration and a second configuration, wherein in the first configuration the fairing is arranged to shield an element of the landing gear from incident airflow and wherein in the second configuration the fairing is arranged to deflect debris or spray propelled from one or more of the wheels.

Accordingly, the fairing provides a plurality of functions. In the first configuration, the fairing shields landing gear elements from incident airflow, reducing the noise induced by components of the landing gear on landing, and also protects the landing gear from damage caused by impact from foreign bodies. In the second configuration, the fairing is positioned to the rear of the landing gear, and contains foreign objects projected from the landing gear towards the airframe, engines or other critical aircraft elements, while the aircraft is on the ground.

Advantageously, the fairing moves relative to the aircraft landing gear between the first configuration and the second configuration.

Preferably, when in the first configuration, the fairing is arranged to prevent a foreign body striking the landing gear element.

Advantageously, the fairing includes perforations or mesh to allow some of the incident airflow to pass through.

Preferably, the fairing includes aerodynamic features which assist the transition of the fairing between the first and second configurations.

Advantageously, the fairing is pivotally coupled to the landing gear. In this configuration, the landing gear preferably includes a telescopic support leg and an operating linkage coupled between the telescopic support leg and the fairing, the operating linkage being arranged to pivot the fairing with respect to the landing gear as the telescopic leg is compressed. The telescopic support leg may be arranged to rotate about a longitudinal axis to move the fairing between the first and second configurations. Alternatively, the landing gear may include a telescopic support leg and the fairing is pivotally coupled to a first collar rotatably mounted on the telescopic support leg. A second collar may then be rotatably mounted on the telescopic support leg, the landing gear further including an actuator coupled between the second collar and the fairing and arranged to pivot the fairing about its coupling with the first collar.

As an alternative to the fairing being pivotally coupled to the landing gear, the fairing may be pivotally coupled to the axle or hub of one of the wheels and is arranged to rotate about a longitudinal axis of the axle between the first and second configurations.

Advantageously, the aircraft landing gear further comprises an electro-mechanical or hydra-mechanical actuator arranged to move the fairing between the first and second configurations, the actuator being preferably located on the axle or hub of one of the wheels.

BRIEF DESCRIPTION OF THE DRAWINGS

Embodiments of the present invention are described in more detail below, by way of non-limiting illustrative example, with reference to the accompanying figures, of which.

DESCRIPTION OF EMBODIMENTS

Figure 1:
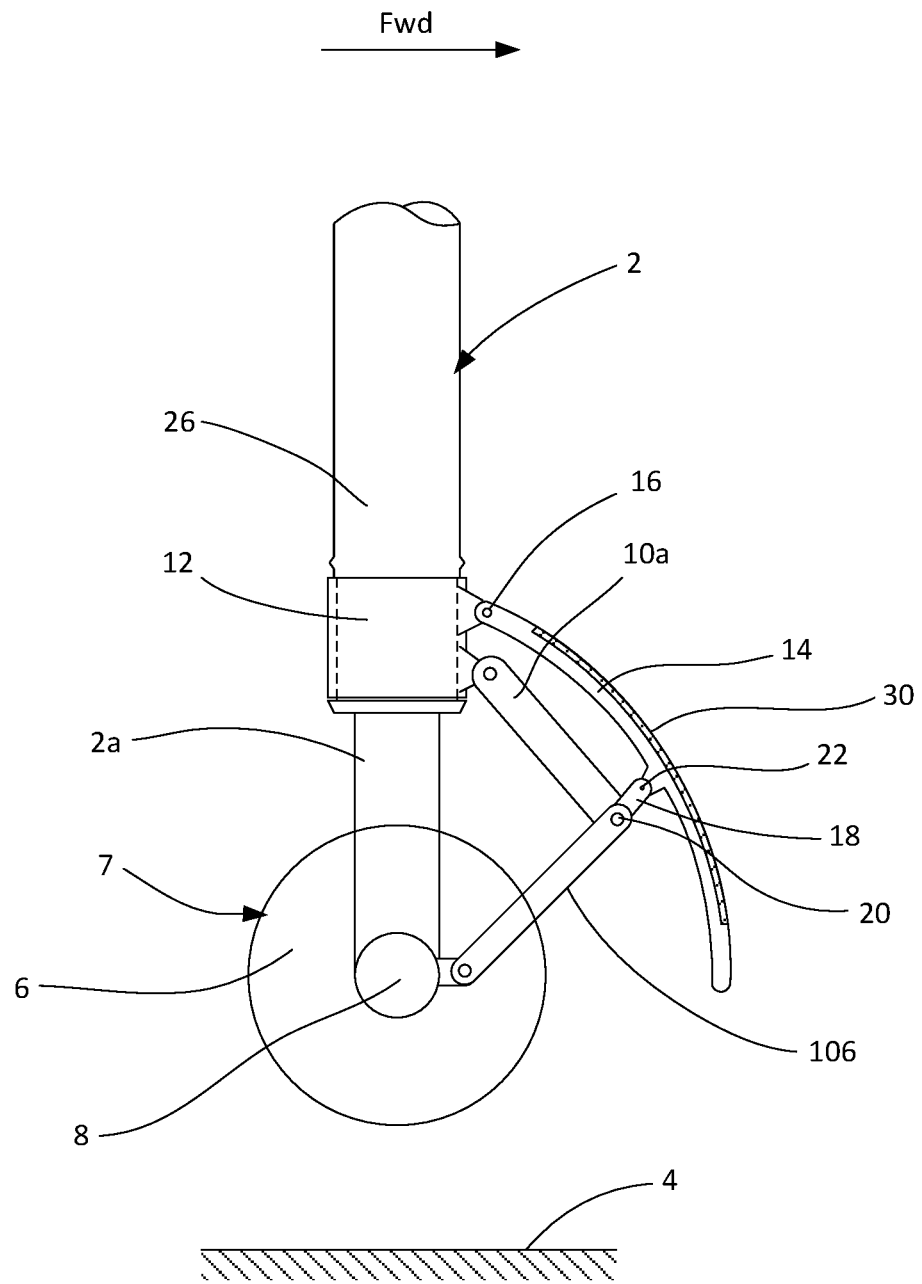
FIG. 1 schematically illustrates an aircraft landing gear according to an embodiment of the present invention in which the landing gear is unloaded and a fairing is in a first configuration.

FIG. 1 illustrates a first embodiment of an aircraft landing gear according to the present invention. The landing gear includes a telescopic support leg 2, shown in FIG. 1 fully extended, the landing gear being illustrated prior to coming into contact with the ground 4 and therefore unloaded. In the particular embodiment illustrated, the landing gear is a nose landing gear with a wheel assembly 7 having a single pair of tyres 6 located at either end of an axle 8, which forms part of the lower portion 2a of the telescopic support leg 2. It will however be appreciated that this design could be implemented on a main landing gear with a bogie beam having two or more pairs of tyres, the mechanism described herein incorporated into any of the wheels. A mechanical linkage such as a slave link or a torque link, comprising an upper linkage arm 10a and a lower linkage arm 10b is pivotally connected between upper and lower portions 2a, 2b of the telescopic support leg 2 in a known manner. Optionally, the mechanical linkage provides structural support to the landing gear. In the configuration illustrated, the upper linkage arm 10a is pivotally connected to a turning collar 12 rotatably mounted on the upper portion 2a of the telescopic support leg 2 which provides the mechanical linkage with a freedom to rotate around the telescopic support leg 2. It will be appreciated that the wheels/tyres/brake assembly have been illustrated in simplified form for the purposes of clarity.

A fairing 14 covers a large area at the front of the landing gear and is preferably wide enough to cover a substantial portion of the wheel assembly 7 including both tyres 6, and any associated brakes, jacking points or other known landing gear elements (not shown). The fairing 14 is pivotally connected by a pivot attachment 16 to the turning collar 12 above the location at which the upper linkage arm 10a connects to the turning collar 12. An operating linkage 18, such as a rigid metal bar or rod, is pivotally connected at one end to an articulation joint 20 of the mechanical linkage and at its other end to a further pivot attachment 22 of the fairing 14.

In a first configuration, the fairing 14 is positioned in front of the landing gear and arranged to shield noise inducing components of the wheel assembly 7 such as brakes and jacking points from incident airflow.

The fairing 14 may also be arranged such that it prevents foreign bodies or other debris from striking the brakes or other elements of the landing gear when it is in the first configuration. To allow this, the fairing 14 may be constructed from a material such as a metal alloy or fibre reinforced plastic, so that it is sufficiently strong to resist impact from such foreign bodies. The fairing 14 may be designed to withstand impacts without damage, or may be designed to absorb the impact energy by deforming or collapsing in a controlled manner. In order to allow some incident airflow to pass through, the fairing 14 may include perforations or mesh 30.

Figure 2:
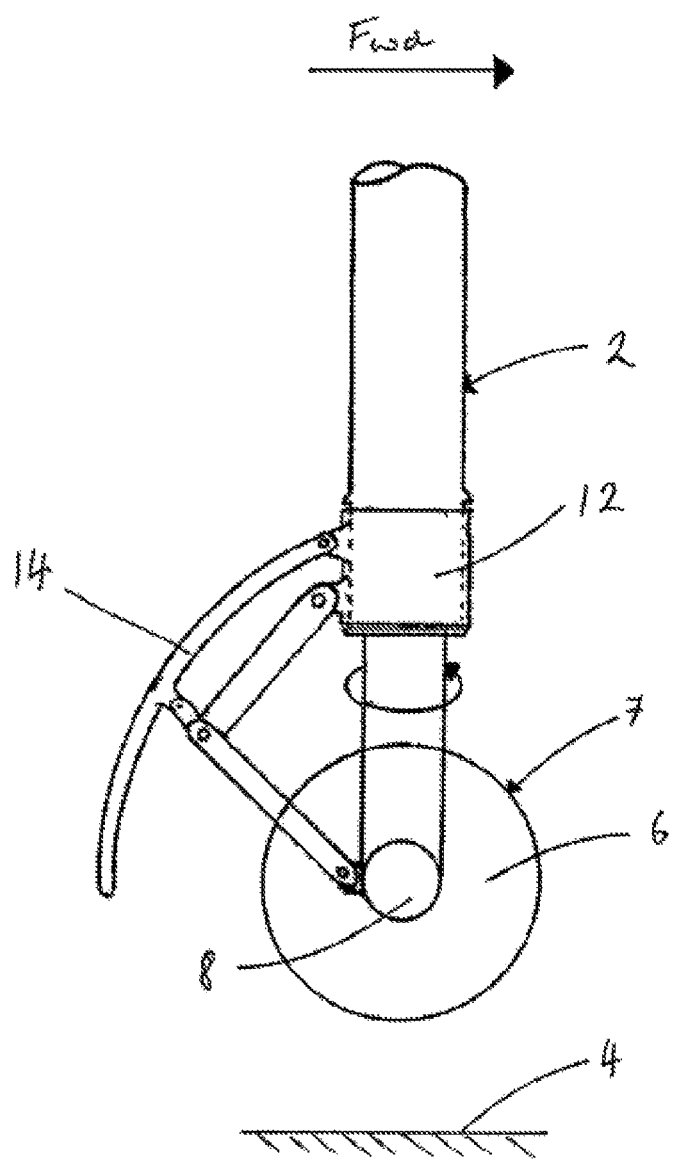
FIG. 2 schematically illustrates the aircraft landing gear of FIG. 1 in which the landing gear has been rotated so that the fairing is in a second configuration.

FIG. 2 shows the aircraft landing gear illustrated in FIG. 1 immediately prior to landing on the ground, the lower portion 2a of the telescopic support leg 2 having been rotated through 180 degrees with respect to the upper portion of the telescopic support leg 2 and the airframe, from the first configuration in which the fairing 14 is arranged to shield an element of the landing gear from incident airflow (shown in FIG. 1), into a second configuration in which the fairing is located to the rear of the wheel assembly and arranged to deflect any debris or spray propelled from the wheels. In the second configuration, the fairing 14 no longer shields the wheel assembly 6, 8 and in particular any associated brakes from the airflow, allowing for full cooling of the brakes, which is desirable during braking on landing. In this embodiment, only the lower portion 2a of the telescopic support leg 2 is rotated to move the fairing 14 between first and second configurations, by means of a mechanical, hydraulic or electrical actuator. Alternatively however, the entire telescopic support leg 2 including upper and lower portions 2a, 2b could be rotated 180 degrees with respect to the airframe.

To promote rotation of the fairing 14 from the first configuration to the second, one or more aerodynamic features may be incorporated into the fairing itself. These may include channels, projections, depressions or ribs running along the front edge of the fairing, or fins located on the fairing, or any other suitable known aerodynamic features. Such features are preferably arranged to induce rotation of the fairing 14 once rotation has been initiated by the actuator i.e. when moving the fairing 14 from the first to the second configuration. However, whilst the aircraft is airborn and the fairing 14 is maintained in the first configuration shielding incident airflow to landing gear elements, any aerodynamic features preferably should be arranged not to induce a rotational force on the fairing 14, so as not to incur undue wear on the fairing 14 or actuating mechanisms whilst the aircraft is in flight.

Figure 3:
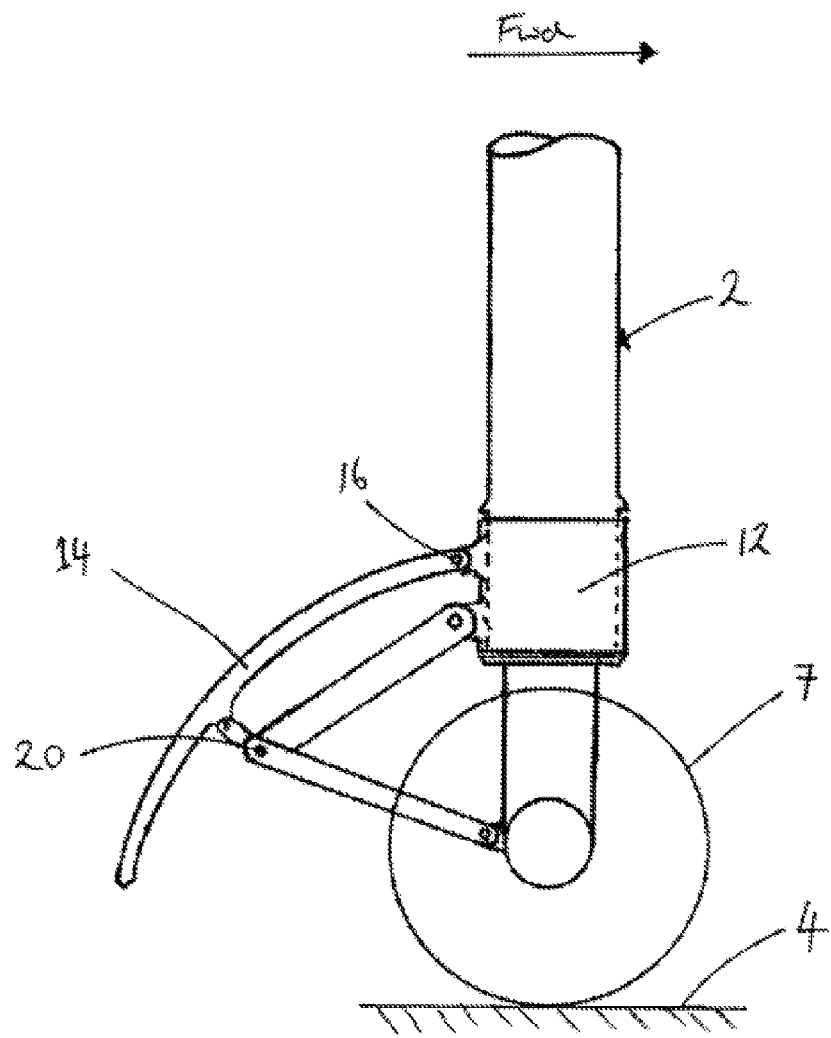
FIG. 3 schematically illustrates the aircraft landing gear of FIG. 2 in which the landing gear is loaded.

FIG. 3 shows the aircraft landing gear illustrated in FIG. 2 after touch-down of the aircraft on the ground 4. As can be seen, the telescopic support leg 2 is now compressed and as a result the upper and lower linkage arms 10a, 10b have been compressed towards one another, in turn decreasing the vertical displacement between the apex joint 20 and the turning collar 12. Since the fairing 14 is coupled to both the apex joint 20 and the turning collar 12, the fairing 14 takes a more horizontal profile with respect to the ground, pivoting upwards about the pivot attachment 16. Accordingly, the fairing 14 is spaced further away from the wheel assembly 6, 8 allowing access to brakes or jacking points associated with the landing gear, whilst maintaining a position suitable for deflecting debris or spray emanating from the wheels away from the underside of the aircraft fuselage.

Optionally, a pilot of the aircraft may choose not to rotate the fairing 14 into the second configuration prior to touchdown. The pilot may make the decision based on the quality of the runway surface, the weather conditions or other relevant factors, or due to a failure of the actuating mechanism. In which case, on landing, compression of the telescopic support leg 2 will result in the fairing pivoting about the pivot attachment 16, away from noise inducing components of the landing gear so that they are no longer shielded from incident airflow. This will allow for cooling of the brakes even if the fairing is maintained in the first configuration.

Figure 4:
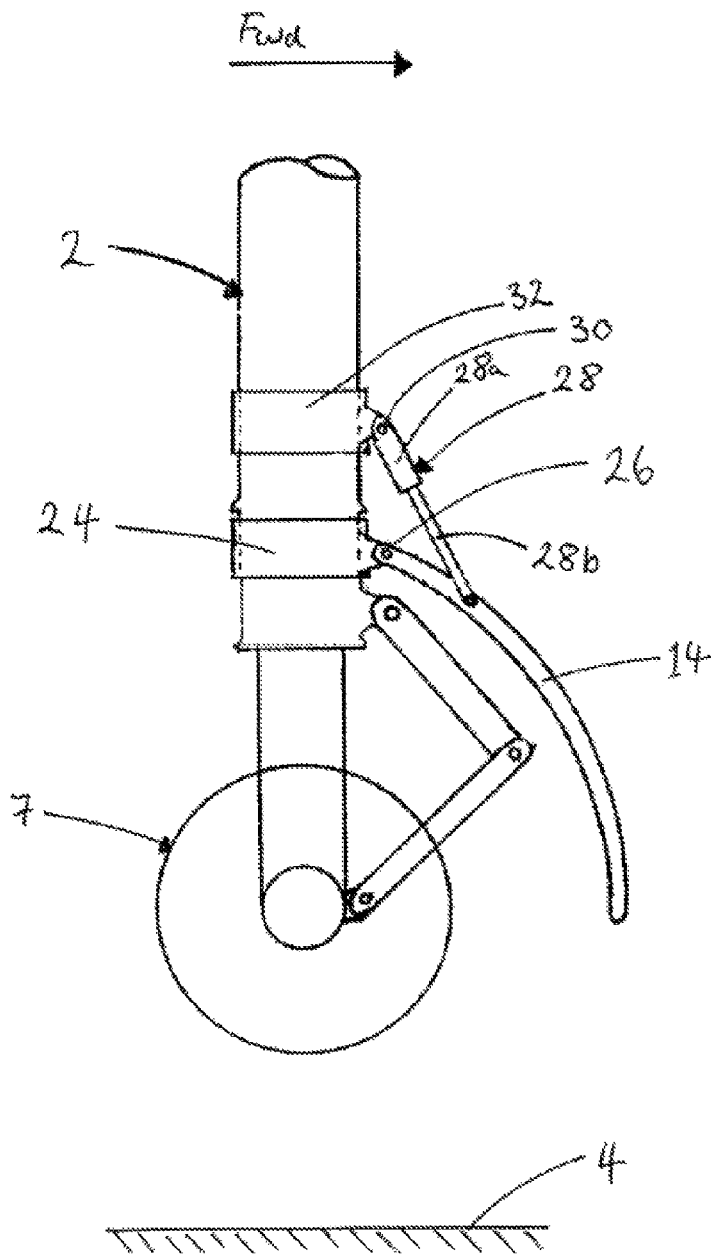
FIG. 4 schematically illustrates an aircraft landing gear according to an alternative embodiment of the present invention in which the landing gear is unloaded.

An alternative embodiment of an aircraft landing gear according to the present invention is illustrated in FIG. 4, with the telescopic support leg 2 again being fully extended, i.e. unloaded. In this embodiment, the fairing 14 is no longer coupled to the mechanical linkage 10 or the turning collar 12. Instead, the fairing 14 is pivotally attached at a pivot attachment 26 to a first turning collar 24 rotatably mounted on the upper portion of the telescopic support leg 2. An operating linkage 28 is connected at one end to the fairing 14 at a pivot attachment located on the fairing 14. The opposite end of the operating linkage is attached to a second turning collar 32, rotatably mounted on the upper portion of the telescopic support leg 2 above the first turning collar 24. The operating linkage 28 may be a rigid metal bar or rod. However, in the embodiment illustrated in FIG. 4, the operating linkage 28 is an extendable actuator, preferably comprising a housing 28a and a piston 28b mounted within the housing 28a. Actuator 28 may be hydraulic, mechanical or electrical or any other actuator known in the art. When the actuator 28 is in its extended position, the fairing 14 is arranged to deflect incident air away from the wheel assembly. Retraction of the actuator 28 causes the fairing 14 to pivot about the pivot attachment 26 lifting the fairing 14 out of the airstream incident to the wheel assembly 7 allowing air to pass over elements of the wheel assembly 7, such as brakes, to allow maximum cooling. The angle of the fairing 14 can also be adjusted to allow for maximum shielding of particular elements of the landing gear, or may be placed in to a position of minimum resistance to oncoming air.

Figure 5:
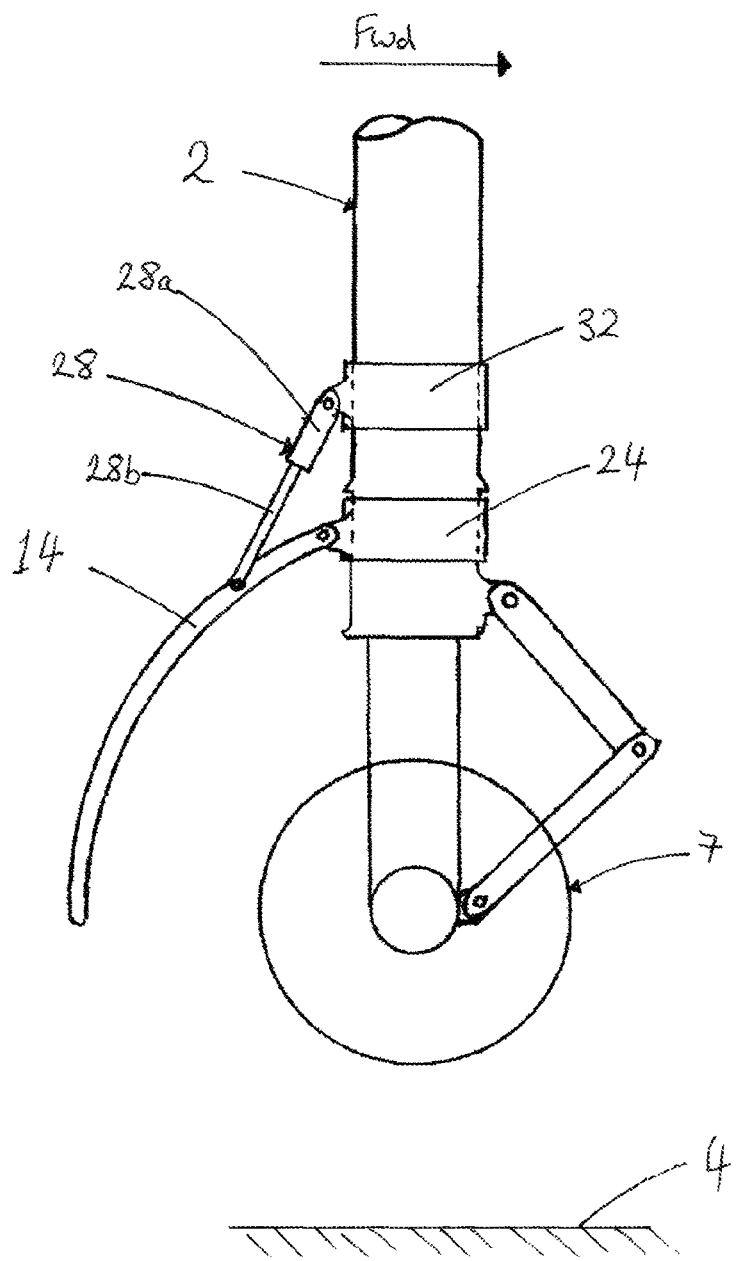
FIG. 5 schematically illustrates the aircraft landing gear of FIG. 4 in which a fairing has been rotated from a first configuration to a second configuration.

FIG. 5 shows the landing gear illustrated in FIG. 4 immediately prior to touch-down of the aircraft on the ground 4. As the aircraft comes in to land, both turning collars 24, 32 are rotated through 180 degrees with respect to the aircraft into a second configuration so that the fairing 14 is located to the rear of the wheel assembly. In this configuration the fairing is arranged to deflect any debris or spray propelled from the wheels once the aircraft has landed on the ground 4, equivalent to the configuration shown in FIG. 2. Rotation of the fairing about the landing gear may be performed by an actuator (not shown) located on or within the telescopic support leg 2, producing rotational torque on either or both of the second or third turning collars. Preferably the actuator is an electrical or hydraulic actuator. However, it will be appreciated that any suitable actuator known in the art could be employed.

Figure 6:
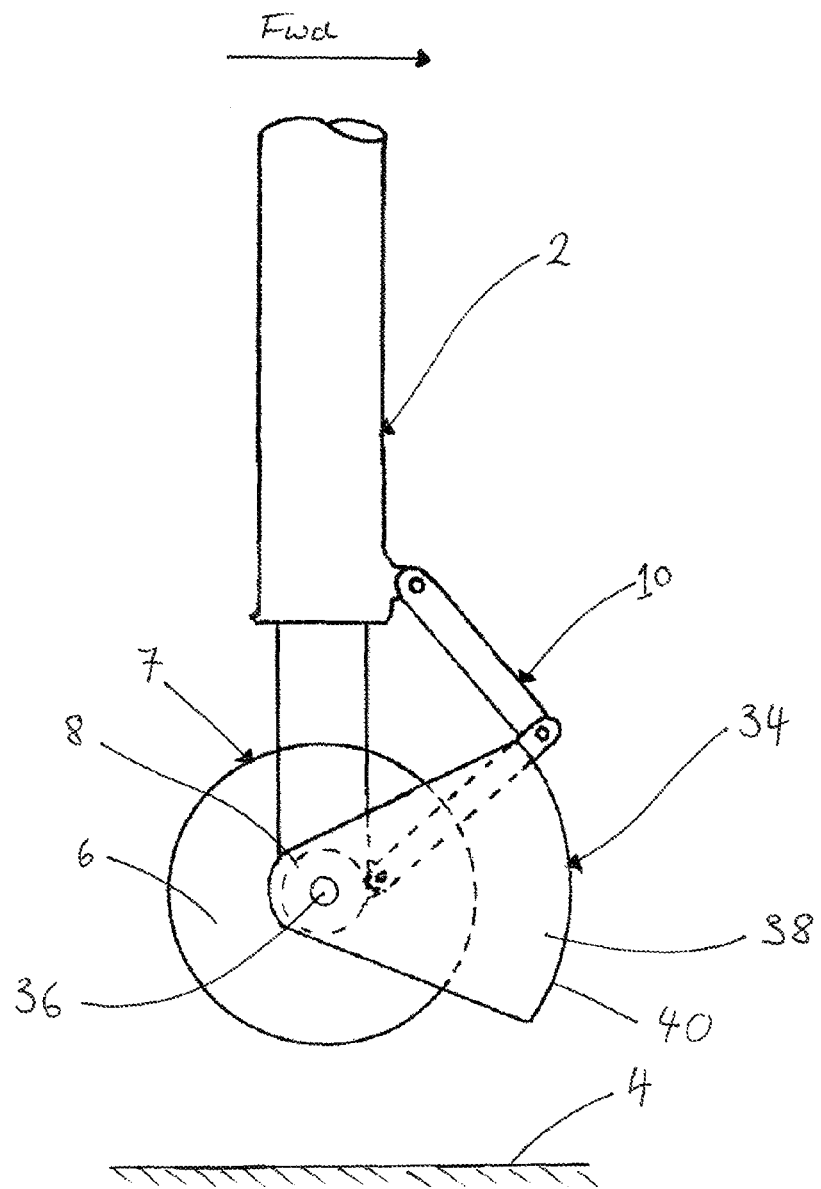
FIG. 6 schematically illustrates an aircraft landing gear according to a further alternative embodiment of the present invention in which a fairing is positioned in a first configuration.

A further alternative embodiment of an aircraft landing gear according to the present invention is illustrated in FIG. 6. The landing gear is shown off the ground with the telescopic support leg 2 unloaded and in the fully extended position. It will be appreciated that the wheels/tyres/brake assembly have again been illustrated in simplified form for the purposes of clarity. A fairing 34 is rotatably mounted on the axle 8 of the landing gear at a rotatable attachment 36 and arranged to be rotatable about an axis parallel to the longitudinal axis of the axle 8. The fairing 34 extends perpendicular to the axle 8 and is arranged to encapsulate a segment of the wheel assembly 7 including one or more of the wheels 6 and preferably any associated brakes, jacking points or other known landing gear elements (not shown). The fairing 34 is preferably secured to the axle 8 at rotational attachments at both ends of the axle 8, the fairing 34 extending across the width of the wheel assembly 7. In which case, side walls 38 may extend perpendicular to the axle 8, connected at their extremities by a plate 40 extending between the two side walls 28. The surface of plate 40 is preferably contoured to match the shape of the wheel 6 as shown in the illustration. An actuator (not shown) is integrated into the wheel assembly, or mounted thereon, the actuator arranged to control rotation of the fairing 34 about the longitudinal axis of the axle 8. It will be appreciated by a person skilled in the art that any suitable known actuator could be employed for this purpose. Preferably however, the actuator is an electrical or hydraulic actuator and is mounted so as to be shielded from incident airflow by the fairing 34.

In this configuration (the first configuration) the fairing 34 is arranged to shield elements of the landing gear from incident airflow Like the fairing 14 shown in FIGS. 1 and 4, the fairing 34 may be arranged such that it prevents foreign bodies or other debris from striking the brakes or other elements of the landing gear when it is in the first configuration. To allow this the fairing 34 may be constructed from a material sufficiently strong to resist impact from such foreign bodies, such as a metal alloy or fibre reinforced plastic. The fairing 34 may be designed to withstand such impacts without damage or may be designed to absorb the impact energy by deforming or collapsing in a controlled manner. In order to allow some incident airflow to pass through, the fairing 34, including side walls 38 and plate 40 may include perforations or mesh.

Figure 7:
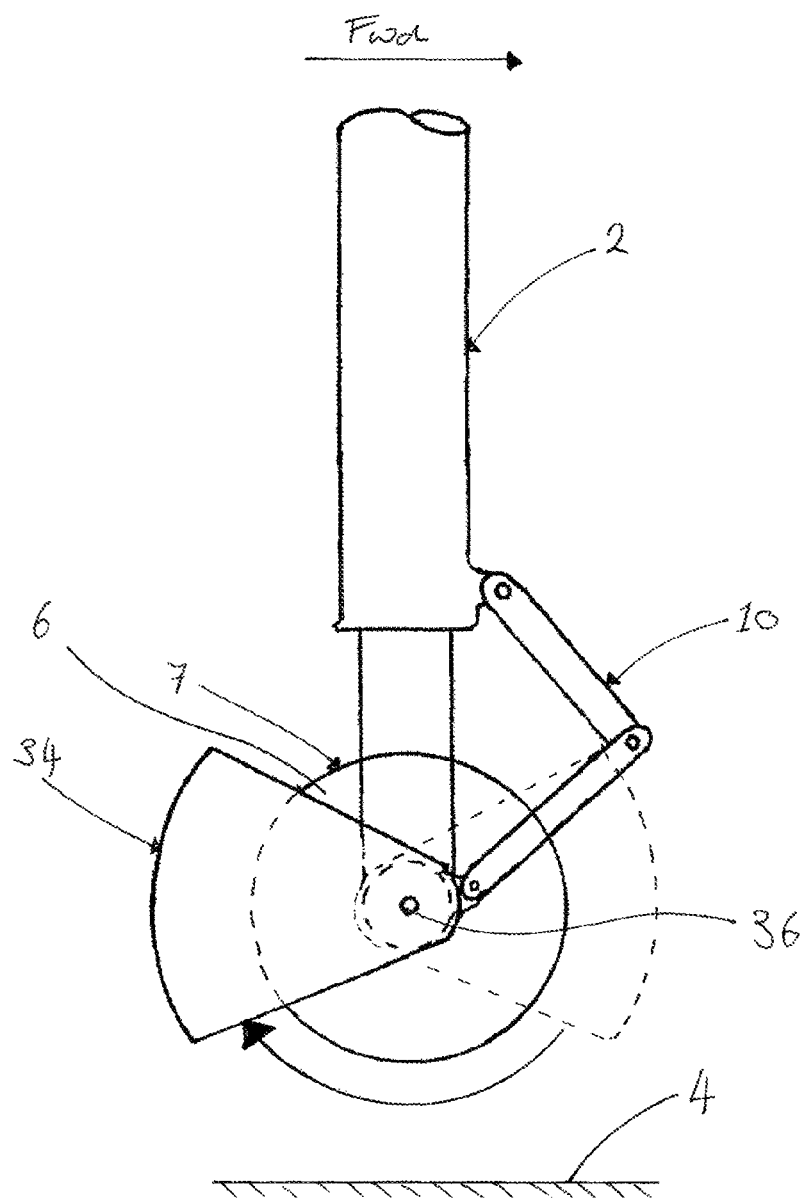
FIG. 7 schematically illustrates the aircraft landing gear of FIG. 6 in which the fairing is positioned in a second configuration.

FIG. 7 shows the aircraft landing gear of FIG. 6 immediately prior to touch-down on the ground 4. The fairing 34 has been rotated around the wheel by the actuator about the rotational attachment 36 from the first configuration (outlined by broken lines) to a second configuration in which the fairing 34 is located to the rear of the wheel assembly 7 and arranged to deflect any debris or spray propelled from the wheels 6.

As with the fairing 14 described in FIGS. 1 to 5, the fairing 34 may include aerodynamic features arranged to induce rotation of the fairing from first to second configurations. Such features have already been described earlier in this application with reference to FIG. 2, and so do not need further explanation.

The skilled person will appreciate that there is a danger that the fairing 34 illustrated in FIGS. 6 and 7 could interfere with elements of the landing gear in either the first or second configuration. For example as shown in FIG. 6, in the first configuration the fairing 34 overlaps the mechanical linkage 10. In this case a cut-out could be made in the fairing 34 to allow it to move into the position illustrated without interfering with the mechanical linkage 10, the mechanical linkage slotting into the cut-out as the fairing 34 is rotated anticlockwise (in the view shown) into the first configuration. Associated engineering solutions known to the skilled person may need to be employed for other elements of the landing gear, including hydraulic cable and any other element which may pose a hazard to the free movement of the fairing 34 between first and second configurations.

To ensure clarity, the above description and referenced figures show implementation in respect of a simplified nose landing gear. It will however be appreciated that any of the designs described herein could be implemented on any design of landing gear, for example main landing gear with a bogie beam having two or more pairs of tyres located along the bogie, the mechanisms described herein being incorporated into any or all of the wheels or wheel assemblies located thereon.

The invention claimed is:

1. An aircraft landing gear including wheels and a fairing, wherein the fairing is moveable, whilst the landing gear is fully extended, between a first configuration and a second configuration, wherein in the first configuration the fairing is arranged to shield an element of the landing gear from incident airflow and wherein in the second configuration the fairing is arranged to deflect debris or spray propelled from one or more of the wheels, wherein the fairing is pivotally coupled to the landing gear, and wherein the landing gear includes a telescopic support leg and an operating linkage coupled between the telescopic support leg and the fairing, the operating linkage being arranged to pivot the fairing with respect to the landing gear as the telescopic leg is compressed.

2. An aircraft landing gear according to claim 1, wherein the fairing moves relative to the aircraft landing gear between the first configuration and the second configuration.

3. An aircraft landing gear according to claim 1, wherein in the first configuration the fairing is arranged to prevent a foreign body striking the landing gear element.

4. An aircraft landing gear according to claim 1, wherein the fairing includes perforations or mesh to allow some of the incident airflow to pass through.

5. An aircraft landing gear according to claim 1, wherein the fairing includes aerodynamic features which assist the transition of the fairing between the first and second configurations.

6. An aircraft landing gear according to claim 1, wherein the telescopic support leg is arranged to rotate about a longitudinal axis to move the fairing between the first and second configurations.

7. An aircraft landing gear according to claim 1 wherein the landing gear includes the telescopic support leg and the fairing is pivotally coupled by a pivot attachment to a first collar rotatably mounted on the telescopic support leg.

8. An aircraft landing gear according to claim 7 wherein a second collar is rotatably mounted on the telescopic support leg and wherein the landing gear includes an actuator coupled between the second collar and the fairing and arranged to pivot the fairing about the pivot attachment.

9. An aircraft landing gear according to claim 1, further comprising an electro-mechanical or hydra-mechanical actuator arranged to move the fairing between the first and second configurations.

* * * * *